O. C. SQUYER.
Spring Scale.
No. 28,212. Patented May 8, 1860.
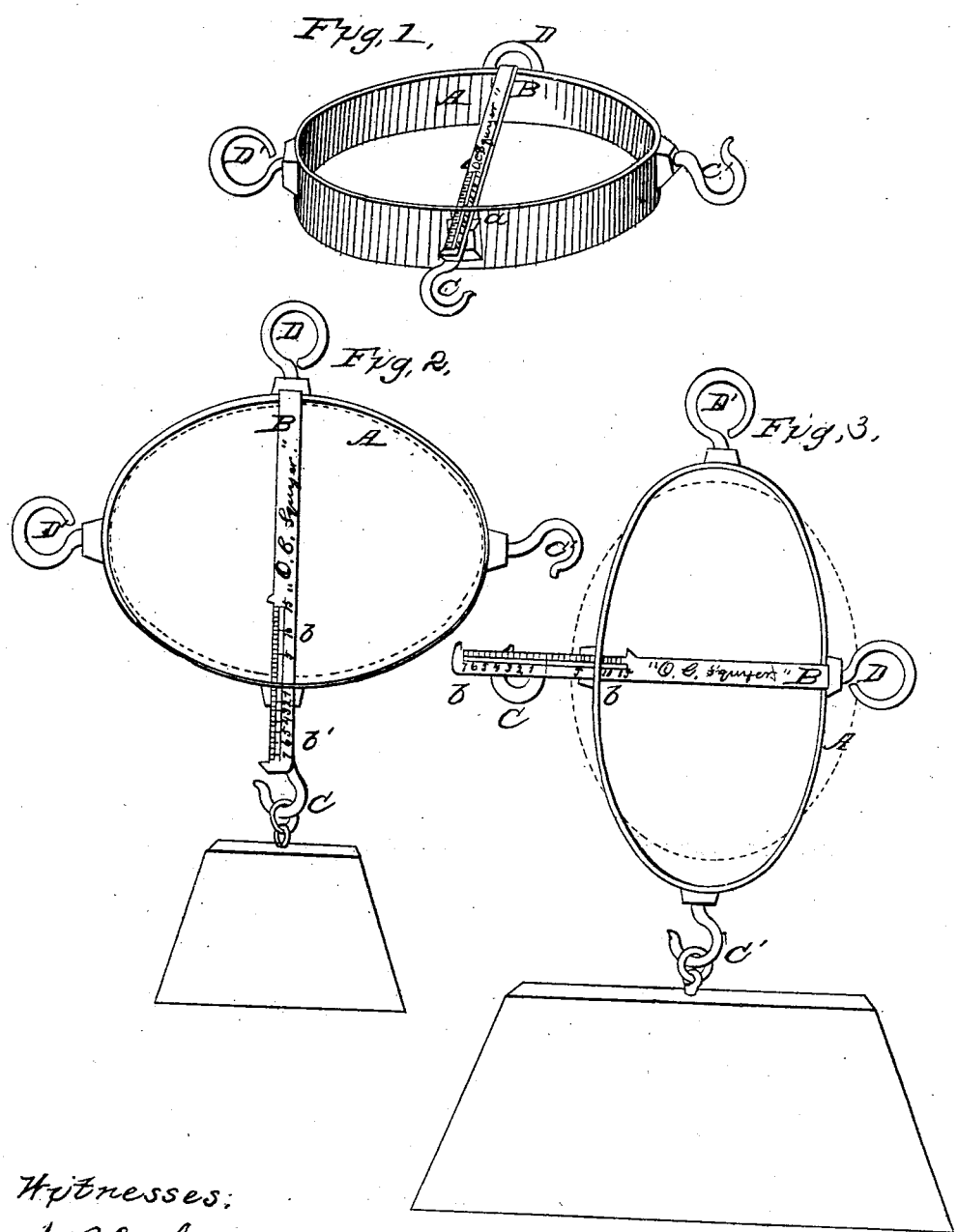
Witnesses:
A. R. McLean
Seymore Hurix
Inventor:
Oscar C. Squyer

UNITED STATES PATENT OFFICE.

OSCAR C. SQUYER, OF WEST DRESDEN, NEW YORK.

COMPENSATING SPRING-BALANCE.

Specification of Letters Patent No. 28,212, dated May 8, 1860.

*To all whom it may concern:*

Be it known that I, OSCAR C. SQUYER, of West Dresden, in the county of Yates and State of New York, have invented a new and Improved Compensating Spring-Balance or Scale for Weighing Various Articles; and I do hereby declare that the following is a full and exact description thereof, reference being had to the accompanying drawings and the letters of reference marked thereon.

Figure 1, is a perspective view of the balance. Fig. 2, a sectional view, and Fig. 3, is also a sectional view showing the scale as used in two directions for compensating.

The same letters have reference to similar parts in all the figures.

To enable others skilled in the art to make and use my invention, I will proceed to describe its construction and operation.

A, is an endless ring of metal made in the form of a circle or oval, (bearing suitable spring temper) to which one end of the graduated arm B, is rigidly secured while the other end of it passes freely through the slot $a$, in A. This arm or bar B, is graduated from zero (0) either way with $1, \frac{1}{2}, \frac{1}{4}, \frac{1}{8}$, or $\frac{1}{16}$ pound graduations marked thereon. The swivel hook C, is attached upon the side of A, as is also that of C'. The rings D, and D', are attached upon the opposite sides of A. The various forms of making the endless ring A, constitutes quite an important consideration in their construction, as the form of a perfect circle would make the graduations of the bar B, equal on the two sides $b$, and $b'$, from zero, and it would take the same weight attached to the hook C, to indicate a certain number of graduations on $b'$, that it would take if applied to the hook C', to indicate a like number of graduations on $b$. But when the form assumes an oval shape, then the force or weight as applied to the hooks C, C', changes—the longer and narrower the oval is, the greater will be the difference of weight required to actuate the spring—as for instance by elongating the oval, the weight of one ounce would move the bar B, one degree on $b'$ if applied to the hook C, while it would take one pound to move to one degree on the side $b$, if applied to the hook C.

The dotted lines in Figs. 2 and 3, show the balance or scale when at rest while the full lines indicate the position as it would be with the weights attached as shown.

It is compensating by being susceptible of use or strain from D, to C, or from D', to C'. By this arrangement, if the ring A, loose strength in the direction from D, to C, by using it in the direction from D', to C' it will compensate or help to regain its original power.

It is unnecessary to direct here, how to use my invention, as the drawings (which form a part of these specifications) and the foregoing description fully shows its application.

What I claim as my invention, and desire to secure by Letters Patent, is—

The metallic spring endless ring A, in a circular or oval form, with the graduated arms or bar B, hooks C, C', and rings D, D', constructed and operated as substantially set forth.

OSCAR C. SQUYER.

Witnesses:
A. R. MCLEAN,
SEYMOUR HURD.